H. B. NAYLOR.
GRAIN CRIB.
APPLICATION FILED OCT. 24, 1912.

1,061,683.

Patented May 13, 1913.
3 SHEETS—SHEET 1.

WITNESSES
R. A. Balderson
G. B. Fleming

INVENTOR
H. B. Naylor,
by Bakewell, Byrnes & Parmelee,
Attys

H. B. NAYLOR.
GRAIN CRIB.
APPLICATION FILED OCT. 24, 1912.
1,061,683.
Patented May 13, 1913.
3 SHEETS—SHEET 2.
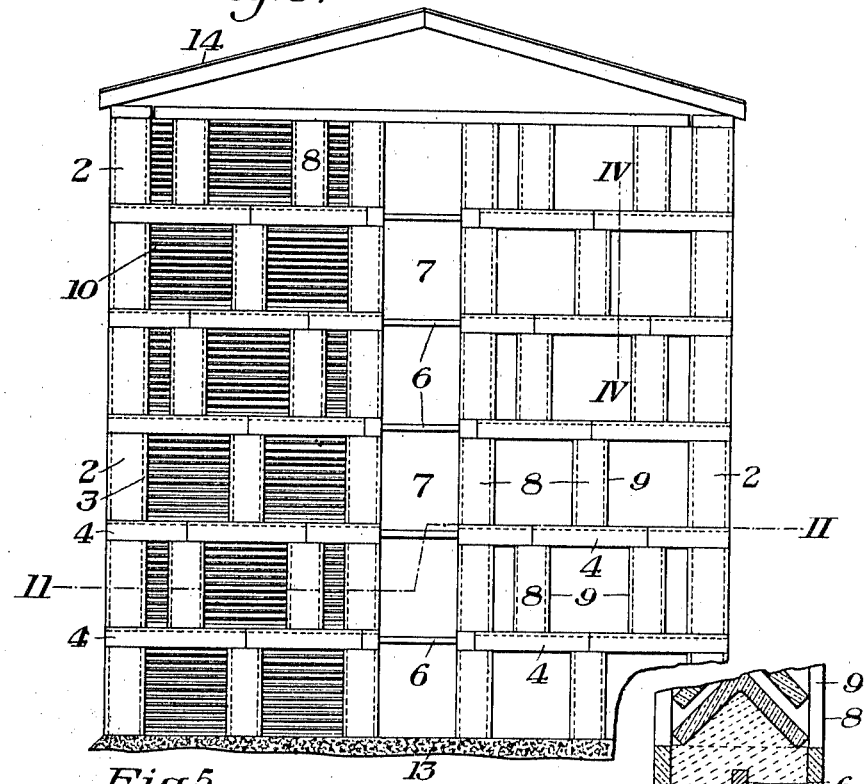
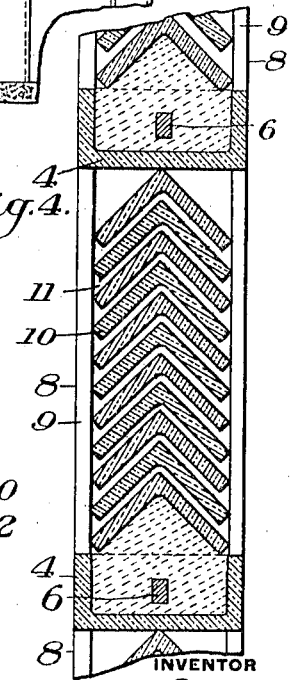
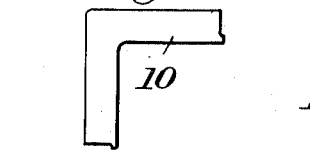
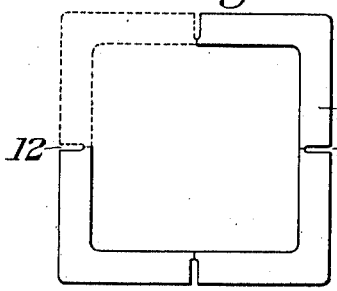
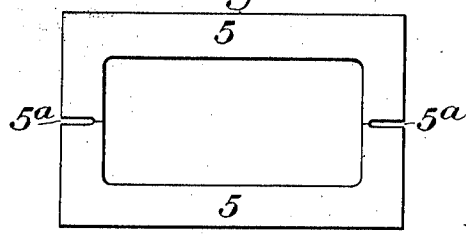
WITNESSES
INVENTOR H. B. NAYLOR.
GRAIN CRIB.
APPLICATION FILED OCT. 24, 1912.
1,061,683.
Patented May 13, 1913.
3 SHEETS—SHEET 3.
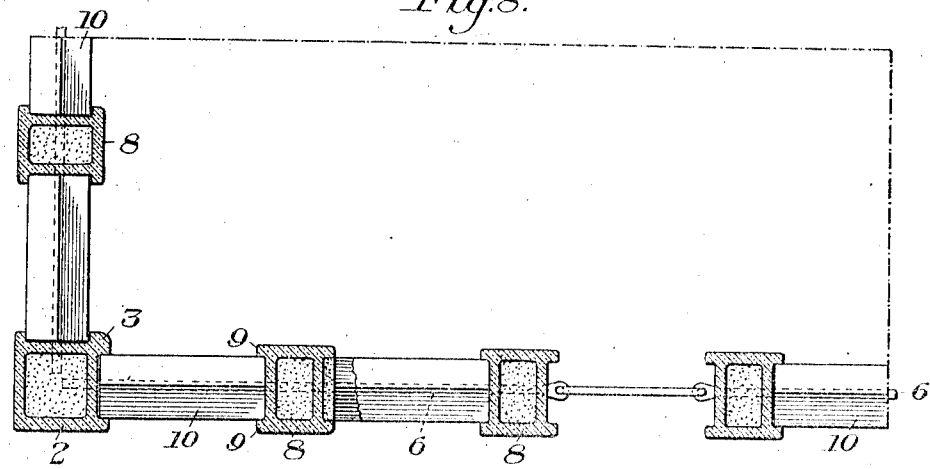
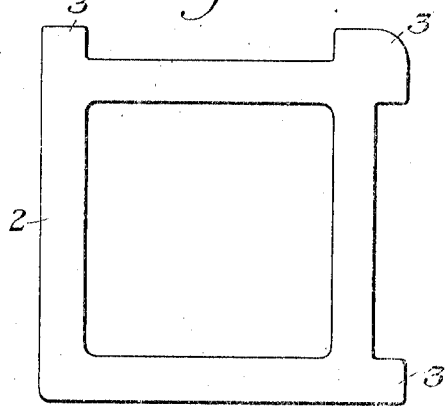
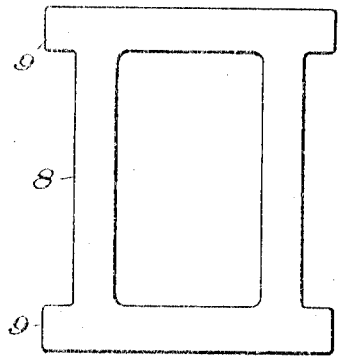
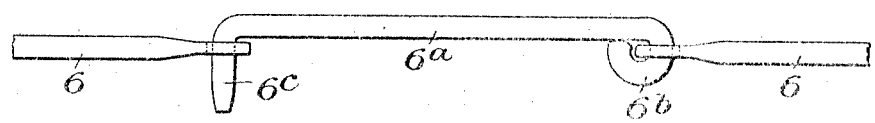
WITNESSES
INVENTOR

UNITED STATES PATENT OFFICE.

HARRY B. NAYLOR, OF PITTSBURGH, PENNSYLVANIA, ASSIGNOR TO THE NATIONAL FIRE PROOFING COMPANY, OF PITTSBURGH, PENNSYLVANIA, A CORPORATION OF PENNSYLVANIA.

GRAIN-CRIB.

1,061,683.  Specification of Letters Patent.  Patented May 13, 1913.

Application filed October 24, 1912. Serial No. 727,564.

*To all whom it may concern:*

Be it known that I, HARRY B. NAYLOR, a citizen of the United States, and a resident of Pittsburgh, county of Allegheny, and State of Pennsylvania, have invented a new and useful Improvement in Grain-Cribs, of which the following is a full, clear, and exact description, reference being had to the accompanying drawings, forming part of this specification, in which—

Figure 1:
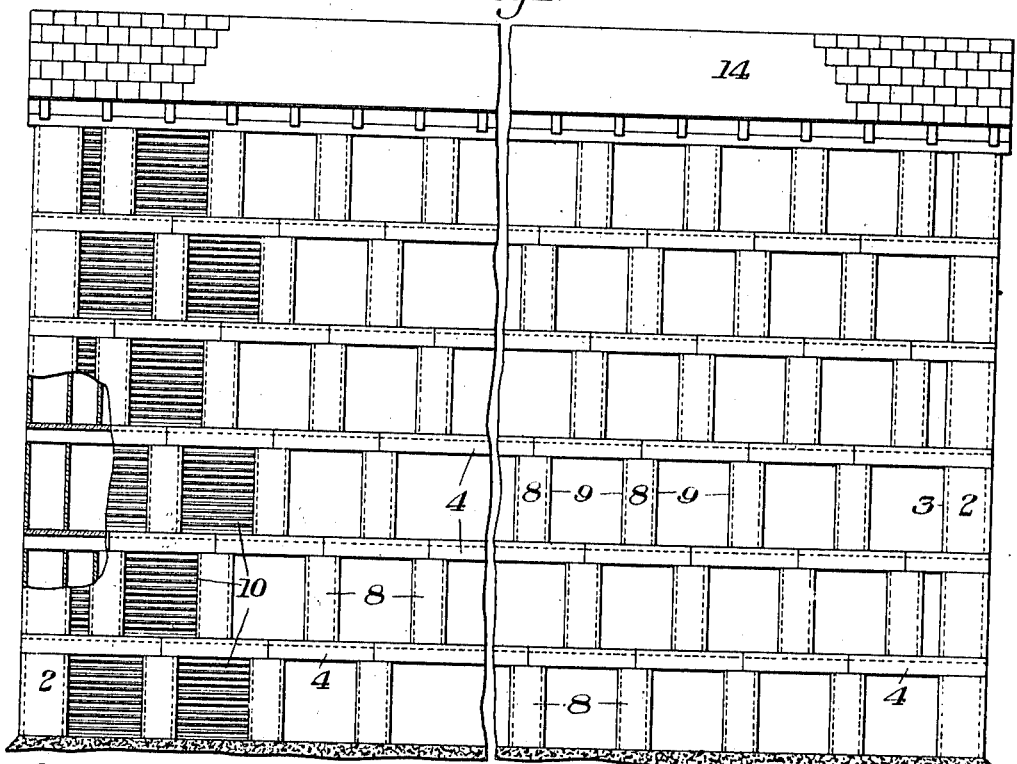
Figure 2:
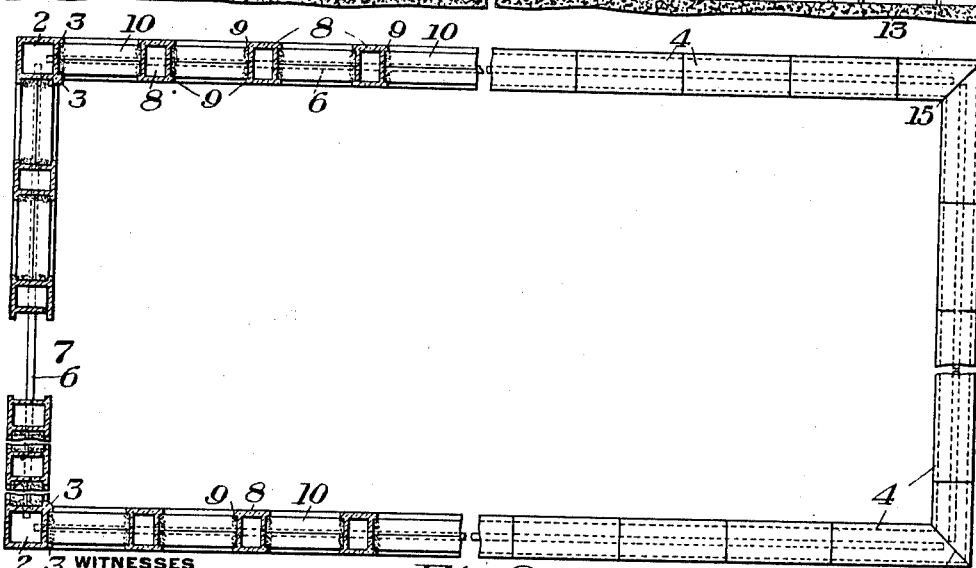

Figure 1 is a side elevation, partly broken away, of a grain crib embodying my invention; Fig. 2 is a sectional plan view of the same, taken on the line II—II of Fig. 3;
Fig. 3 is an end elevation of the crib with some of the ventilators removed; Fig. 4 is a vertical section through a portion of the crib wall; Fig. 5 is a plan view showing how the channel members of the crib may be constructed; Fig. 6 is a similar view showing how the ventilators may be constructed; Fig. 7 is an end view of one of the ventilators, and corresponding to the portion shown in dotted lines in Fig. 6; Fig. 8 is a horizontal section on a large scale of a portion of the crib; Figs. 9 and 10 are top plan views of the corner and intermediate columns respectively; and Fig. 11 is a detail view showing one of the door bars.

My invention has relation to grain cribs, such as corn cribs, and is designed to provide a grain crib having its side and end walls constructed wholly of tile members.

The invention provides a grain crib which can be constructed at a comparatively low cost; which is durable; which provides for effective ventilation of the interior of the crib; and in which the ventilators are so arranged as to exclude weather, the entrance of vermin, etc., and also prevent the escape of shelled grain.

The nature of my invention will be best understood by reference to the accompanying drawings in which I have shown the preferred embodiment thereof, and which will now be described; it being premised, however, that various changes may be made in the details of construction and arrangement of the several parts without departing from the spirit and scope of my invention, as defined in the appended claims.

In these drawings, the numeral 2 designates the corner columns of the structure. These columns consist of hollow rectangular tile sections, having on their two inner sides the corner ribs 3 for the purpose hereinafter described. The superposed sections of the corner columns are separated from each other by the horizontally extending beams 4, these beams preferably consisting of tile sections in the form of channels placed end to end in such a manner as to break joints in successive beams. These channel members may be conveniently made by forming rectangular tiles 5 of the form shown in Fig. 5, with scores or slots 5ª at opposite sides, the tiles being subsequently broken to each form two channels. Preferably the troughs of the channels are filled with concrete or cement; the beams being further reinforced by one or more metallic rods, 6, extending through each beam, as shown in Figs. 2 and 3. These reinforcing rods may extend continuously across any door openings 7 which are provided in the structure as shown in Fig. 3, or they may consist of vertically swinging sections 6ª, as shown in Fig. 11, one end being pivoted at 6ᵇ and the other end being formed with a hook 6ᶜ to engage an eye on the reinforce. Intermediate the corner columns, the channel members are supported at intervals upon column sections 8, which are preferably in the form of hollow rectangular tiles, having corner lips or flanges 9. These column sections are preferably so placed as to be out of alinement vertically, each section supporting at its upper end the joint between two of the channel members and resting at its lower end upon the intermediate portion of a channel member. The spaces between these column sections contain ventilators, as partially shown in Figs. 1, 2 and 3 (some of the ventilators being removed from these figures for convenience). Each set of ventilators consists of a plurality of angular tile members 10 of inverted V-form placed one above another in the manner most clearly shown in Fig. 4, and separated from each other by intervening ventilator spaces 11. The ventilators are secured against vertical displacement by cementing their ends to the columns, and are held against lateral displacement by the lips 3 and 9 on the column sections. The ventilators may be conveniently formed from hollow rectangular tiles, such as shown in Fig. 3, each tile being scored as indicated at 12, and then broken apart to form four of the ventilators.

The structure may be erected on any suitable foundation 13, and may be provided with any suitable roof 14.

The structure described can be rapidly constructed at a comparatively low cost and provides an extremely durable and efficient grain crib. The angular form of the spaces between the ventilators not only prevents the entrance of weather to the interior of the crib but they also prevent the escape of shelled grain therethrough. These spaces can be made sufficiently narrow so as to prevent the entrance of mice, rats and other vermin, while at the same time a much larger total amount of ventilating space is provided than has been provided heretofore.

The channel members as shown are preferably extended to the extreme corners of the structure, the ends of the corner channels being beveled to fit each other, as shown at 15 in Fig. 2.

What I claim is:

1. A grain crib having a wall composed of separated horizontal courses of tiles, and spaced vertical tiles between said courses and supporting the same, the open spaces between the courses intermediate of the vertical tiles having a plurality of spaced parallel ventilator members; substantially as described.

2. A grain crib, having a wall composed of separated horizontal courses of tiles, and spaced vertical tiles between said courses and supporting the same at the joints thereof, the open spaces between the courses intermediate of the vertical tiles having a plurality of spaced parallel ventilator members; substantially as described.

3. A grain crib having a wall composed of separated horizontal courses of tiles, and spaced vertical tiles between said courses and supporting the same at the joints thereof, the open spaces between the courses intermediate of the vertical tiles having a plurality of spaced parallel ventilator members, the vertical tiles between adjacent horizontal courses being in staggered relation except at the corners of the building and adjacent to door openings in the wall, where they are in line; substantially as described.

4. A grain crib having a wall composed of separated horizontal courses of tiles, and spaced vertical tiles between said courses and supporting the same, the open spaces between the courses intermediate of the vertical tiles having a plurality of spaced parallel ventilator members, the vertical tiles having corner ribs or flanges to retain said members; substantially as described.

5. A grain crib having a wall composed of separated horizontal courses of tiles, and spaced vertical tiles between said courses and supporting the same, the open spaces between the courses intermediate of the vertical tiles having a plurality of spaced angular ventilator members; substantially as described.

6. A grain crib having a wall composed of separated horizontal courses of tiles, and spaced vertical tiles between said courses and supporting the same, the open spaces between the courses intermediate of the vertical tiles having a plurality of horizontal ventilator members of inverted V-shaped tiles in nested spaced relation; substantially as described.

7. A grain crib having a wall composed of separated horizontal courses of tiles, and spaced vertical tiles between said courses and supporting the same, the open spaces between the courses intermediate of the vertical tiles having a plurality of spaced parallel ventilator members, the tiles in the horizontal courses being of channel form and having a filling of plastic material; substantially as described.

8. A grain crib having a wall composed of separated horizontal courses of tiles, and spaced vertical tiles between said courses and supporting the same, the open spaces between the courses intermediate of the vertical tiles having a plurality of spaced parallel ventilator members, the tiles in the horizontal courses being of channel form and having a filling of plastic material, and reinforcing members embedded in the said filling and extending throughout the course; substantially as described.

9. A grain crib having a wall composed of separated horizontal courses of tiles, and spaced vertical tiles between said courses and supporting the same, the open spaces between the courses intermediate of the vertical tiles having a plurality of spaced parallel ventilator members, the tiles in the horizontal courses being of channel form and having a filling of plastic material, and reinforcing members embedded in the said filling and extending throughout the course, and having connections across door openings formed in the wall; substantially as described.

In testimony whereof, I have hereunto set my hand.

HARRY B. NAYLOR.

Witnesses:
 JESSE B. HELLER,
 H. M. CORWIN.